United States Patent
Bidarkar et al.

(10) Patent No.: US 9,201,755 B2
(45) Date of Patent: Dec. 1, 2015

(54) REAL-TIME, INTERACTIVE MEASUREMENT TECHNIQUES FOR DESKTOP VIRTUALIZATION

(71) Applicant: VMware, Inc., Palo Alto, CA (US)

(72) Inventors: Rishi Bidarkar, Sunnyvale, CA (US); Lawrence Spracklen, Boulder Creek, CA (US); Banit Agrawal, Sunnyvale, CA (US); Vikram Makhija, Milpitas, CA (US)

(73) Assignee: VMware, Inc., Palo Alto, CA (US)

( * ) Notice: Subject to any disclaimer, the term of this patent is extended or adjusted under 35 U.S.C. 154(b) by 331 days.

(21) Appl. No.: 13/767,767

(22) Filed: Feb. 14, 2013

(65) Prior Publication Data

US 2014/0229527 A1    Aug. 14, 2014

(51) Int. Cl.
*G06F 15/16* (2006.01)
*G06F 11/34* (2006.01)
*G06F 9/54* (2006.01)

(52) U.S. Cl.
CPC .............. *G06F 11/3466* (2013.01); *G06F 9/54* (2013.01); *G06F 2209/549* (2013.01)

(58) Field of Classification Search
CPC .. G06F 11/3466; G06F 9/54; G06F 2209/549
See application file for complete search history.

(56) References Cited

U.S. PATENT DOCUMENTS

| | | | |
|---|---|---|---|
| 6,168,431 B1 | 1/2001 | Narusawa et al. | |
| 6,381,362 B1 | 4/2002 | Deshpande et al. | |
| 6,421,678 B2 | 7/2002 | Smiga et al. | |
| 7,155,681 B2 | 12/2006 | Mansour et al. | |
| 7,287,275 B2 | 10/2007 | Moskowitz | |
| 7,532,642 B1 | 5/2009 | Peacock | |
| 7,552,467 B2 | 6/2009 | Lindsay | |
| 7,593,543 B1 | 9/2009 | Herz et al. | |
| 7,796,978 B2 | 9/2010 | Jones et al. | |
| 7,831,661 B2 | 11/2010 | Makhija et al. | |
| 8,166,107 B2 | 4/2012 | Makhija et al. | |
| 8,347,344 B2 | 1/2013 | Makhija et al. | |
| 2001/0023436 A1 | 9/2001 | Srinivasan et al. | |
| 2002/0026505 A1* | 2/2002 | Terry | 709/221 |
| 2004/0073947 A1* | 4/2004 | Gupta | 725/134 |
| 2004/0137929 A1 | 7/2004 | Jones et al. | |
| 2004/0184526 A1 | 9/2004 | Penttila et al. | |
| 2004/0221315 A1 | 11/2004 | Kobayashi | |
| 2005/0187950 A1 | 8/2005 | Parker et al. | |

(Continued)

OTHER PUBLICATIONS

U.S. Appl. No. 13/273,071, filed Oct. 14, 2011 titled "Watermarking and Scalability Techniques for a Virtual Desktop Planning Tool".

(Continued)

*Primary Examiner* — Wen-Tai Lin

(57) ABSTRACT

In one embodiment, a server system receives, from a client device configured to remotely access a desktop hosted by the server system, user input directed to the desktop. The server system further identifies a desktop operation to be performed in response to the user input, where the identifying is performed without relying on preconfigured information that indicates what the desktop operation should be, determines when the desktop operation has completed, and adds, upon completion of the desktop operation, one or more markers to the desktop. The server system then transmits an image of the desktop that includes the one or more markers to the client device, thereby signaling the completion of the desktop operation to the client device.

18 Claims, 10 Drawing Sheets

(56) References Cited

U.S. PATENT DOCUMENTS

| | | | |
|---|---|---|---|
| 2005/0234715 | A1 | 10/2005 | Ozawa |
| 2006/0059095 | A1 | 3/2006 | Atkins, III et al. |
| 2006/0206491 | A1 | 9/2006 | Sakamoto et al. |
| 2007/0125862 | A1 | 6/2007 | Uchiyama et al. |
| 2007/0250920 | A1 | 10/2007 | Lindsay |
| 2007/0291771 | A1 | 12/2007 | Cline |
| 2008/0022350 | A1 | 1/2008 | Hostyn et al. |
| 2008/0052783 | A1 | 2/2008 | Levy |
| 2008/0075121 | A1 | 3/2008 | Fourcand |
| 2008/0112490 | A1 | 5/2008 | Kamijo et al. |
| 2008/0212557 | A1 | 9/2008 | Chiricescu et al. |
| 2008/0263634 | A1 | 10/2008 | Kirkland |
| 2009/0100164 | A1 | 4/2009 | Skvortsov et al. |
| 2009/0216975 | A1* | 8/2009 | Halperin et al. ............ 711/162 |
| 2009/0259941 | A1* | 10/2009 | Kennedy, Jr. ............ 715/719 |
| 2009/0268709 | A1 | 10/2009 | Yu |
| 2010/0161711 | A1* | 6/2010 | Makhija et al. ............ 709/203 |
| 2010/0246810 | A1 | 9/2010 | Srinivasan et al. |
| 2010/0306163 | A1* | 12/2010 | Beaty et al. ............ 706/52 |
| 2011/0023691 | A1 | 2/2011 | Iwase et al. |
| 2011/0047211 | A1 | 2/2011 | Makhija |
| 2011/0051804 | A1 | 3/2011 | Chou et al. |
| 2011/0103468 | A1 | 5/2011 | Polisetty et al. |
| 2011/0138314 | A1* | 6/2011 | Mir et al. ............ 715/779 |
| 2011/0179136 | A1 | 7/2011 | Twitchell, Jr. |
| 2011/0188704 | A1 | 8/2011 | Radhakrishnan et al. |
| 2011/0224811 | A1 | 9/2011 | Lauwers et al. |
| 2012/0036251 | A1* | 2/2012 | Beaty et al. ............ 709/224 |
| 2012/0066711 | A1 | 3/2012 | Evans et al. |
| 2012/0081580 | A1 | 4/2012 | Cote et al. |
| 2012/0113270 | A1 | 5/2012 | Spracklen |
| 2012/0167145 | A1 | 6/2012 | Incorvia |

OTHER PUBLICATIONS

"Port Forwarding," Wikipedia, Published Feb. 15, 2010. Retrieved from the internet: URL<http://web.archive.org/web/20100215085655/http://en.wikipedia.org/wiki/Port_forwarding>, 3 pages.

Vegard Larsen, "Combining Audio Fingerprints," Norwegian University of Science and Technology, Department of Computer and Information Science, Publised Jun. 2008, 151 pages.

Lawrence Adrew Spracklen et al, U.S. Appl. No. 13/079,972 entitled, "Quality Evaluation of Multimedia Delivery in Cloud Environments", filed Apr. 5, 2011.

Bhavesh Mehta, U.S. Appl. No. 13/212,054 entitled, "Measurement of Streaming-Audio Quality", filed Aug. 17, 2011.

* cited by examiner

REAL-TIME, INTERACTIVE MEASUREMENT TECHNIQUES FOR DESKTOP VIRTUALIZATION

CROSS REFERENCES TO RELATED APPLICATIONS

This application is related by subject matter to U.S. Pat. No. 7,831,661, issued Nov. 9, 2010, entitled "Measuring Client Interactive Performance Using a Display Channel," U.S. Pat. No. 8,347,344, issued Jan. 1, 2013, entitled "Measuring Remote Video Playback Performance With Embedded Encoded Pixels," and U.S. patent application Ser. No. 13/273,071, filed Oct. 14, 2011, entitled "Watermarking and Scalability Techniques for a Virtual Desktop Planning Tool," the disclosures of which are incorporated herein by reference for all purposes.

BACKGROUND

Desktop virtualization is a technology that allows a user's desktop computing environment ("desktop") to be hosted remotely on a server system, rather than locally on the user's computing device. When the user wishes to access his/her desktop, the user's computing device (referred to as a "client device") connects to the server system using a remote desktop protocol (or "remoting protocol"). The server system then initiates execution of the user's desktop and communicates, via the remoting protocol, with the client computer system in a manner that enables the user to view and interact with the desktop, in real-time or near real-time, on the client device.

An important aspect of assessing the performance of a virtual desktop deployment is understanding the quality of the end-user experience. This quality will depend on, for example, the amount of latency a user perceives as he/she is interacting with his/her desktop. Understanding this quality is particularly important in large scale (e.g., enterprise) deployments since users in such deployments typically connect to their desktops under a variety of different network conditions, and since a particular server system may host many (e.g., tens, hundreds, or more) desktops that share server resources. Both of these factors (varying network conditions and high desktop-to-server consolidation ratio) increase the likelihood that users will experience poor performance at some point during their remote desktop sessions.

One way of understanding the quality of the end-user experience is to ask users to fill out surveys that describe their experiences when accessing their desktops in various scenarios. However, this approach is difficult to manage in a large deployment and relies on subjective user impressions, which may not be accurate. Another way of understanding the quality of the end-user experience is to collect statistics regarding the load (e.g., CPU load, disk I/O, etc.) of the server system and/or the client devices at runtime. However, since these statistics are not "first order" statistics from a user experience perspective (in other words, they do not directly measure metrics perceived by users, such as user-perceived latency or response time), they can only provide a rough idea of remote desktop session performance. Yet another way of understanding the quality of the end-user experience is to configure a test client device and a test server system to simulate a remote desktop workload, and then manually (or via custom testing code) measure the response time on the client-side for particular operations. The problem with this approach is that it cannot be applied to different types of remote desktop implementations or different types of remote desktop workloads without significant reworking of the test configuration, and it cannot provide performance measurements for real-time remote desktop workloads in live (e.g., production) deployments.

SUMMARY

In one embodiment, a server system receives, from a client device configured to remotely access a desktop hosted by the server system, user input directed to the desktop. The server system further identifies a desktop operation to be performed in response to the user input, where the identifying is performed without relying on preconfigured information that indicates what the desktop operation should be, determines when the desktop operation has completed, and adds, upon completion of the desktop operation, one or more markers to the desktop. The server system then transmits an image of the desktop that includes the one or more markers to the client device, thereby signaling the completion of the desktop operation to the client device.

In another embodiment, a client device receives user input corresponding to a desktop operation to be performed with respect to a desktop hosted on a server system. The client device further writes a first log entry identifying the user input and a time at which the user input was received, and transmits the user input to the server system. In response to transmitting the user input, the client device receives, from the server system, an image of the desktop that includes one or more markers, where the one or more markers indicate completion of the desktop operation. The client device then writes a second log entry identifying the user input and a time at which the image of the desktop was received.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Figure 1:
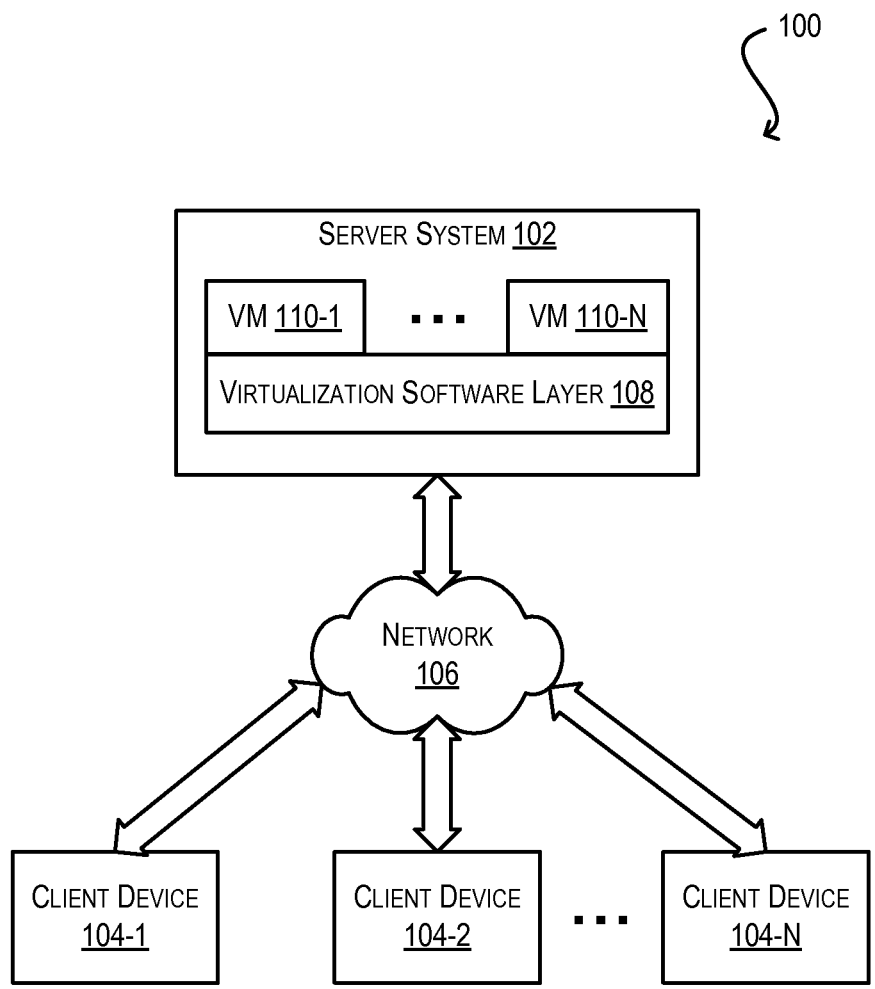
FIG. 1 depicts a block diagram of an exemplary virtual desktop environment.

FIG. 1 depicts an exemplary virtual desktop environment 100. Virtual desktop environment 100 includes a server system 102 that is communicatively coupled with a number of client devices 104-1 through 104-N via a network 106. Server system 102 can interoperate with client devices 104-1 through 104-N to provide virtual desktop services to users of client devices 104-1 through 104-N. For example, server system 102 can host, for each user, a desktop that is presented by an operating system running on server system 102. As used herein, the term "desktop" refers to a computing environment in which a user can launch, interact with, and manage the user's applications, settings, and data. Each client device 104-1 through 104-N can allow a user to view (via a local display device) his/her desktop that is running remotely on server system 102, as well as provide (via one or more local input devices) commands for controlling the desktop. In this manner, the users of client devices 104-1 through 104-N can interact with the desktops hosted on server system 102 as if the desktops were executing locally on client devices 104-1 through 104-N.

In the embodiment of FIG. 1, server system 102 includes a virtualization software layer 108 that supports the execution of one or more virtual machines (VMs) 110-1 through 110-N. In this embodiment, each virtual machine 110-1 through 110-N can execute a guest operating system (GOS) that hosts a desktop for a single user at a time. For example, if five users connect to server system 102 for the purpose of initiating remote desktop sessions, server system 102 can spawn five VMs, each hosting one desktop for each of the five users. This type of remote desktop architecture where user desktops are hosted within separate, server-side virtual machines is referred to as virtual desktop infrastructure, or "VDI."

Alternatively, server system 102 can host user desktops in a non-virtualized environment. For example, server system 102 can run a single instance of an operating system (and thus, a single desktop) that is shared among multiple users in a session-based fashion. As another example, server system 102 can run a single instance of an operating system (and thus, a single desktop) that is only accessible by a single user at a time. One of ordinary skill in the art will appreciate many other ways in which the virtual desktop environment of FIG. 1 can be implemented.

Figure 2:
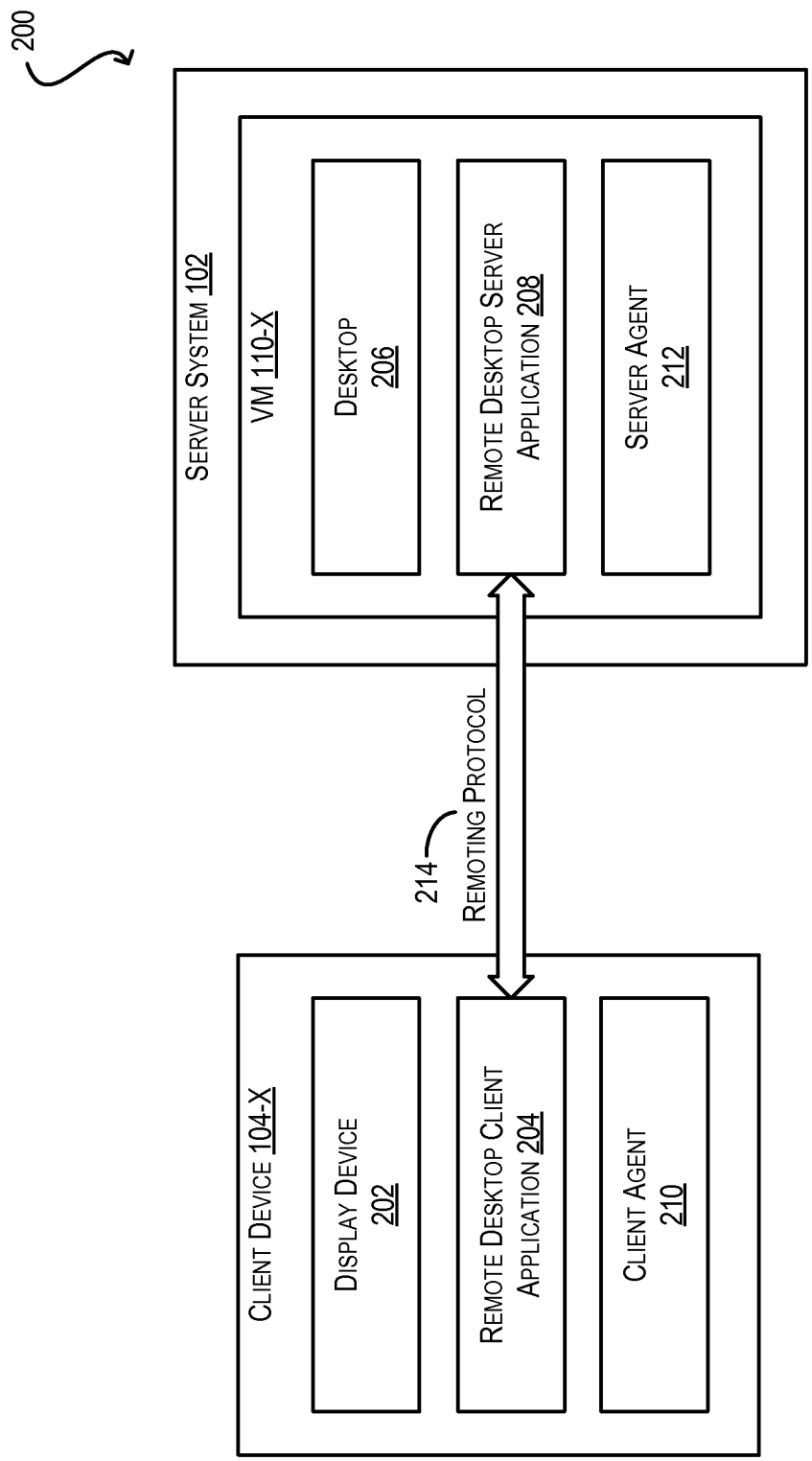
FIG. 2 depicts a block diagram of a client device and a server system that are configured to support desktop virtualization according to one embodiment.

FIG. 2 provides a more detailed view (200) of a particular client device 104-1 through 104-N (referred to as "client device 104-X") and a particular VM 110-1 through 110-N (referred to as "VM 110-X") according to one embodiment. As shown, client device 104-X includes a remote desktop client application 204 and VM 110-X includes a corresponding remote desktop server application 208. Remote desktop client application 204 and remote desktop server application 208 can communicate via a remoting protocol 214 to enable the remote virtual desktop features described with respect to FIG. 1.

For example, remote desktop server application 208 can capture images of a desktop 206 running within VM 110-X and send, via remoting protocol 214, the desktop images to remote desktop client application 204. Remote desktop client application 204 can cause the received desktop images to be displayed on a display device 202 of client device 104-X, thereby presenting the desktop to a user of client device 104-X. At the same time, remote desktop client application 204 can receive user commands directed to desktop 206 and forward the user commands, via remoting protocol 214, to remote desktop server application 208. As the visual state of desktop 206 changes (either in response to the user commands or due to activity initiated by applications/processes running on desktop 206), remote desktop server application 208 can update the desktop images sent to remote desktop client application 204 to reflect those changes in real-time (or near real-time). Remote desktop client application 204 can then cause the updated desktop images to be displayed on display device 202, thereby providing immediate visual feedback regarding the current desktop state to the user.

In certain embodiments, when remote desktop server application 208 sends images of desktop 206 to remote desktop client application 204, remote desktop server application 208 may not send an image of the entire desktop; instead, remote desktop server application 208 may only send sub-regions of desktop 206 that have recently changed. For instance, if the user of client device 104-X inputs a mouse movement that causes a mouse cursor on desktop 206 to move a certain distance, remote desktop server application 208 can transmit only those sub-regions of desktop 206 that are affected by the mouse cursor movement. Remote desktop client application 204 can then merge the sub-regions with the previous desktop images received from remote desktop server application 208 to present an up-to-date representation of desktop 206 on display 202. This approach saves network bandwidth, since the entire desktop image does not need to be transmitted over network 106 for each desktop update.

As noted in the Background section, in some cases an end-user in a virtual desktop deployment (e.g., the user of client device 104-X) can experience poor performance during a remote desktop session due to various factors such as poor network connectivity, high server load, etc. However, with prior art techniques, it is difficult to quantify the quality of this end-user experience, particularly in large scale deployments. To address this, client device 104-X and VM 110-X can include a client agent 210 and a server agent 212 respectively. In various embodiments, client agent 210 and server agent 212 can act in concert during a remote desktop session between client device 104-X and VM 110-X to measure, in a generic manner, metrics that indicate the latency/response time the user of client device 104-X experiences as he/she interacts with desktop 206.

Figure 3:
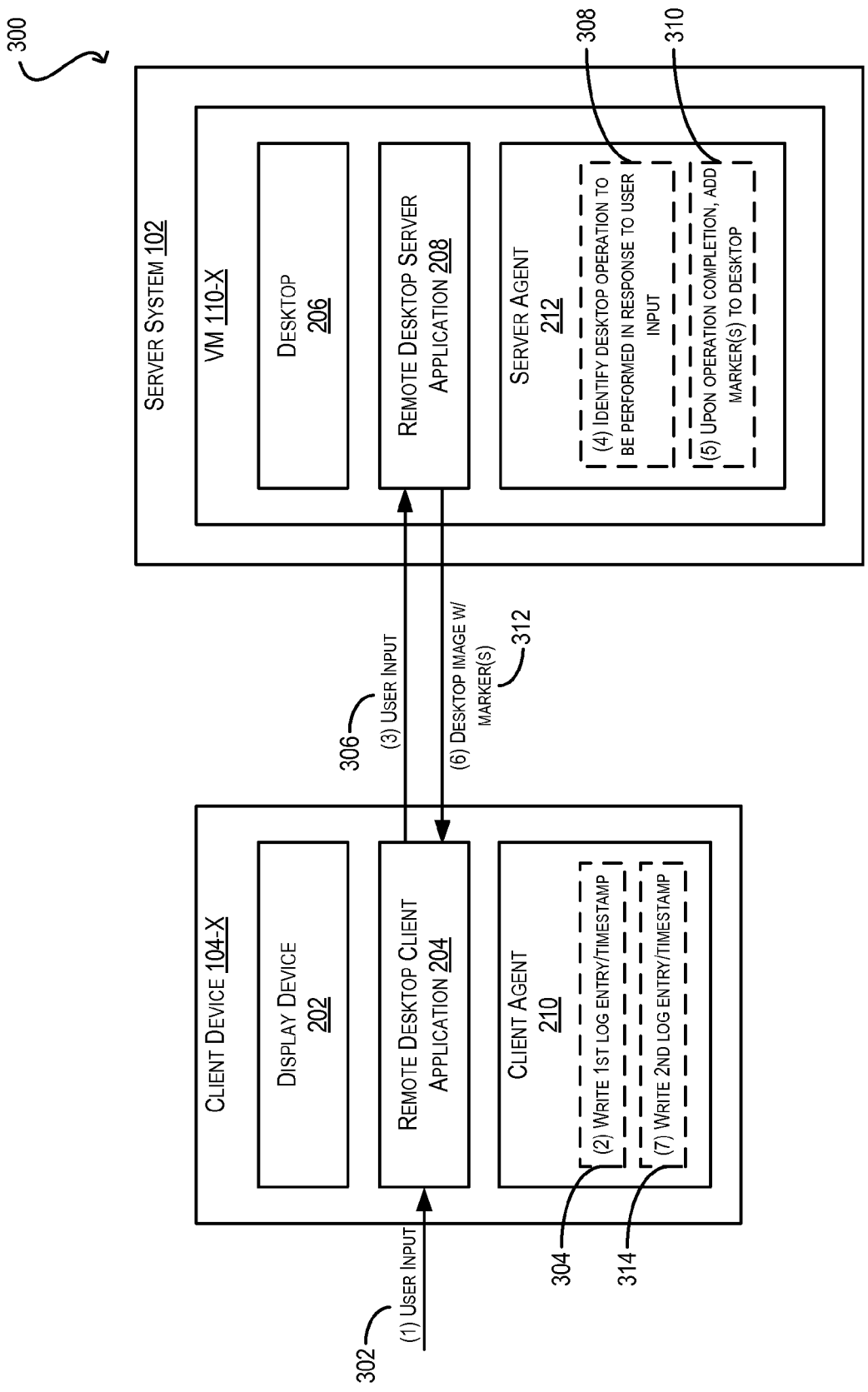
FIG. 3 depicts a flow diagram for measuring client-side latency when performing a remote desktop operation according to one embodiment.

FIG. 3 depicts a data flow 300 between client 104-X and VM 110-X that describes, at a high level, the performance measurement functionality enabled by client agent 210 and server agent 212 according to one embodiment. At step (1) of the flow (reference numeral 302), remote desktop client application 204 can receive, via an input device of client device 104-X, user input intended for desktop 206. The user input can be, for example, a single mouse click, a double mouse click, a mouse "click-and-drag," a keystroke, a touch-screen "tap," or the like.

At step (2) (reference numeral 304), client agent 210 can intercept the user input and write a first log entry that includes a timestamp indicating the time at which the user input was received. Concurrently (or shortly thereafter), remote desktop client application 204 can transmit, at step (3) (reference numeral 306), the user input received at step (1) to remote desktop server application 208.

At step (4) (reference numeral 308), server agent 212 can intercept the user input transmitted at step (3) and automatically identify an interactive operation that will be performed with respect to desktop 206 in response to the user input. For instance, server agent 212 can determine that the user input will result in the launch of desktop application "A," a typing action within desktop application "B," an open file action within desktop application "C," or so on. Significantly, server agent 212 can perform this identification without receiving any semantic information from client device 104-X other than the user input, and without relying on preconfigured information, such as a preconfigured test scenario, that indicates to server agent 212 what the desktop operation should be. Thus, server agent 212 can identify server-side desktop events based on client-side user input events in a generic manner that can be applied, without modification, to any type of remote desktop workload. For example, server agent 212 can identify desktop events based on client-side user input events received in real-time or near-real-time from end users in an actual remote desktop deployment. Additional details regarding this identification process are described with respect to FIG. 5 below.

At step (5) (reference numeral 310), server agent 212 can, upon completion of the identified desktop operation, add one or more markers to desktop 206. In one embodiment, each of the one or more markers can correspond to an arrangement of encoded pixels that are overlaid (via, e.g., a OS-level application programming interface (API) invoked by server agent 212) on top of desktop 206. The one or more markers can indicate to client agent 210 that the desktop operation corresponding to the user input of step (1) has been completed, and thus the results of the desktop operation are now visible on desktop 206. For example, if the user input corresponds to an application launch command, the one more markers can indicate that the application has been launched and a window of the application is now open on desktop 206. As another example, if the user input corresponds to a typing action, the one or more markers can indicate that the typing action has been completed and the typed letters/words are now visible on desktop 206.

At step (6) (reference numeral 312), remote desktop server application 208 can capture an image of the desktop that includes the one or more markers added at step (5) and can transmit the desktop image to remote desktop client application 204. Remote desktop server application 208 can perform this step as part of its normal operation of sending desktop image updates to remote desktop client application 204.

Finally, at step (7) (reference numeral 314), client agent 210 can identify the one or more markers in the desktop image transmitted at step (6) and write a second log entry that includes a timestamp indicating the time at which the one or more markers were received. Since the one or more markers are added to desktop 206 upon completion of the desktop operation corresponding to the user input of step (1), the difference between the timestamps of the first and second log entries can provide a relatively accurate approximation of the latency perceived by the user of client device 104-X for executing the desktop operation from start (e.g., submission of the user input) to finish (e.g., visual confirmation of the results of the desktop operation on display 202).

The performance measurement solution of FIG. 3 provides a number of advantages over prior art techniques. For example, since server agent 212 can generically identify server-side desktop operations based on client-side user input (rather than being hard-coded to recognize, or assume, only a specific set of operations), the performance measurement solution of FIG. 3 can be used to accurately quantify end-user latency for any type of remote desktop workload (rather than being limited to preconfigured or simulated workloads). As noted above, in certain embodiments, the solution of FIG. 3 can be used to measure end-user latency in live remote desktop sessions, thereby allowing system administrators to monitor, in real-time, end-user experiences in production deployments. In these embodiments, client agent 210 and server agent 212 can include a feature that enables system administrators to dynamically turn performance measurement on or off during a live remote desktop session.

As another example, since client agent 210 and server agent 212 are standalone components that are distinct from remote desktop client application 204 and remote desktop server application 208 respectively (as well as distinct from the operating systems running on client device 104-X and VM 110-X), the performance measurement solution of FIG. 3 is modular and can be easily integrated into existing virtual desktop deployments. For instance, client agent 210 and server agent 212 can be configured to interoperate with different types of remote desktop software (e.g., VMware View, Oracle VDI, etc.) and different client/server operating systems (e.g., Windows, variants of Unix, Mac OSX, etc.).

Figure 4A:
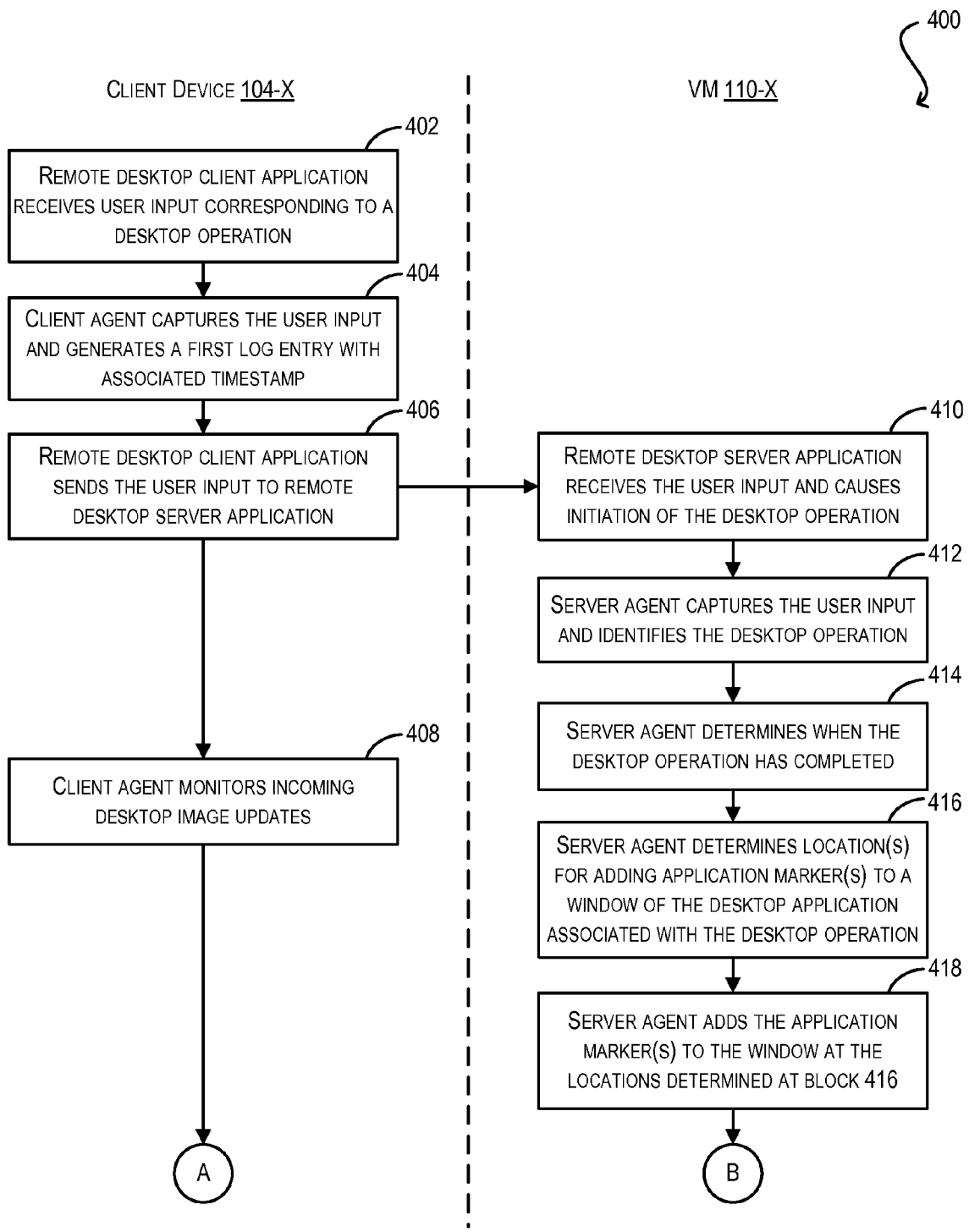
FIGS. 4A and 4B depict a flowchart for measuring client-side latency when performing a remote desktop operation according to one embodiment.
Figure 4B:
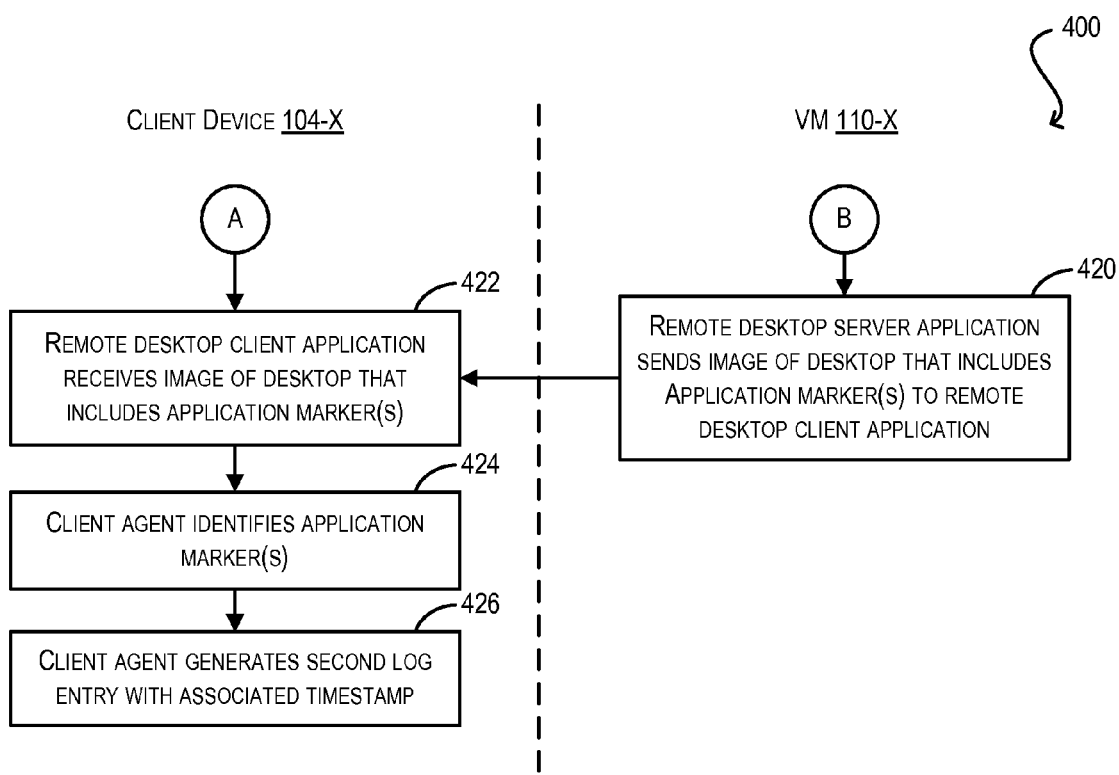

FIGS. 4A and 4B depict a process 400 that provides a more detailed description of the performance measurement functionality enabled by client agent 210 and server agent 212 according to one embodiment. At block 402 of FIG. 4A, remote desktop client application 204 can receive user input corresponding to an interactive operation that a user of client device 104-X wishes to perform with respect to desktop 206. As noted above, the user input can be, e.g., a single mouse click, a double mouse click, a mouse "click-and-drag," a keystroke, a touchscreen "tap," or any other type of input command/event.

At block 404, client agent 210 can intercept or capture the user input and generate a first log entry that includes a first timestamp. The first timestamp can indicate the time at which the user input was received, thereby enabling client agent 210 to remember the effective "start time" of the desktop operation as perceived by the user. In certain embodiments, the first log entry can also include other information, such as a representation of the user input (e.g., mouse click at coordinates X, Y).

Concurrently with block 404 (or shortly thereafter), remote desktop client application 204 can send the user input to remote desktop server application 208 (block 406). Client agent 208 can also begin monitoring the desktop image updates sent by remote desktop server application 208 for one or more markers that signal the completion of the desktop operation (block 408).

At block 410, remote desktop server application 208 can receive the user input and cause the desktop operation corresponding to the user input to be initiated. For example, remote desktop server application 208 can pass the user input to the GOS executing within VM 110-X. The GOS can, in turn, process the user input and thereby initiate the desktop operation with respect to desktop 206.

At substantially the same time, server agent 212 can intercept or capture the user input and automatically identify the desktop operation (block 412). As noted with respect to FIG. 3, server agent 212 can perform this identification in a generic manner, such that server agent 212 does not require any a priori knowledge regarding the remote desktop workload being performed. Rather, server agent 212 need only examine the user input in light of, e.g., state information that is available within VM 110-X at the time the operation initiation (e.g., the state of the GOS and/or desktop processes/applications) in order to ascertain the nature of the desktop operation.

Figure 5:
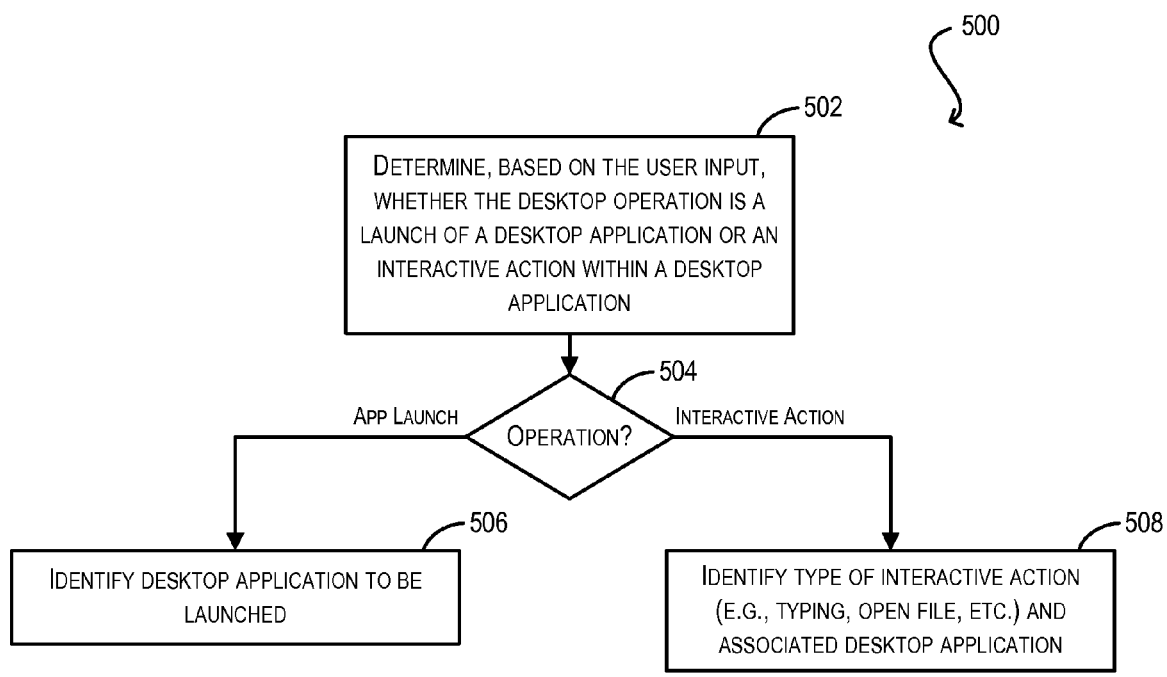
FIG. 5 depicts a flowchart for identifying, at a server system, a remote desktop operation to be performed in response to user input according to one embodiment.

FIG. 5 depicts a process 500 that server agent 212 can perform in the context of block 412 to automatically identify the desktop operation. At block 502, server agent 212 can determine, based on the user input, whether the desktop operation is one of two types: (1) the launch of a desktop application, or (2) an interactive action within already open desktop application. In one embodiment, server agent 212 can perform this determination using heuristics that suggest likely relationships between input event types and desktop operation types. For example, if the user input is a mouse double-click, server agent 212 can infer that the desktop operation is likely to be an application launch. On the other hand, if the user input is a keystroke, server agent 212 can infer that the desktop operation is likely to be an interactive action within an open application.

If the desktop operation is determined to be an application launch (block 504), server agent 212 can identify the specific application being launched (block 506). In one embodiment, server agent 212 can perform this identification by examining the state of the GOS within VM 110-X that hosts desktop 206. For instance, if the GOS is Windows, server agent 212 can invoke one or more Windows APIs to listen for registry or file changes that are known to indicate the launching of an application. Alternatively or in addition, server agent 212 can monitor the Windows active process list to look for newly-appearing processes. With these techniques, server agent 212 can make a reasonably accurate determination of which application is being launched.

If the desktop operation is determined to be an interactive action (block 504), server agent 212 can identify the type of the interactive action (e.g., a typing action, an open file action, etc.) and the desktop application with which the interactive action is associated (block 508). Like the processing at block 506, server agent 212 can perform this identification based on the state of the GOS that hosts desktop 206, as well as the state of processes/applications that are open within desktop 206. For example, if the user input is a keystroke, server agent 212 can invoke one or more OS-level APIs that indicate which application window currently has input focus. Server agent 212 can then infer than the user input was directed to the desktop application that owns that window. Further, based on the identity of the desktop application, server agent 212 can use heuristics to determine the nature of the interactive action. For example, if the desktop application is a word processing application, server agent 212 can determine that the keystroke is likely to be a typing action. One of ordinary skill in the art will recognize many variations, modifications, and alternatives.

Returning to FIG. 4A, once server agent 212 has identified the desktop operation, server agent 212 can determine when the desktop operation has been completed (block 414). For example, if the desktop operation is an application launch, server agent 212 can determine when a new window for the application has been fully rendered on desktop 206. Alternatively, if the desktop operation is an interactive action (such as a typing action), server agent 212 can determine when the results of that interactive action (e.g., typed letters/words) have been become visible on desktop 206.

Upon completion of the desktop operation, server agent 212 can determine locations for adding one or more markers (referred to as "application markers") to a window of the desktop application associated with the desktop operation (block 416). For example, if the desktop operation is a launch of application "A," server agent 212 can determine locations for adding one or more application markers to a window of application A. At block 418, server agent 212 can then add the application markers to the window locations determined at block 416. In one embodiment, server agent 212 can carry out block 418 by invoking an OS-level API that causes the application markers to be rendered on top of the application window within desktop 206. Since server agent 212 adds the application markers to the application window immediately after the completion of the desktop operation, the application markers can act as a signal to client agent 210 that the results of the desktop operation are now visible, and thus a second log entry/timestamp should be recorded to determine the user-perceived latency of the desktop operation.

Figure 6:
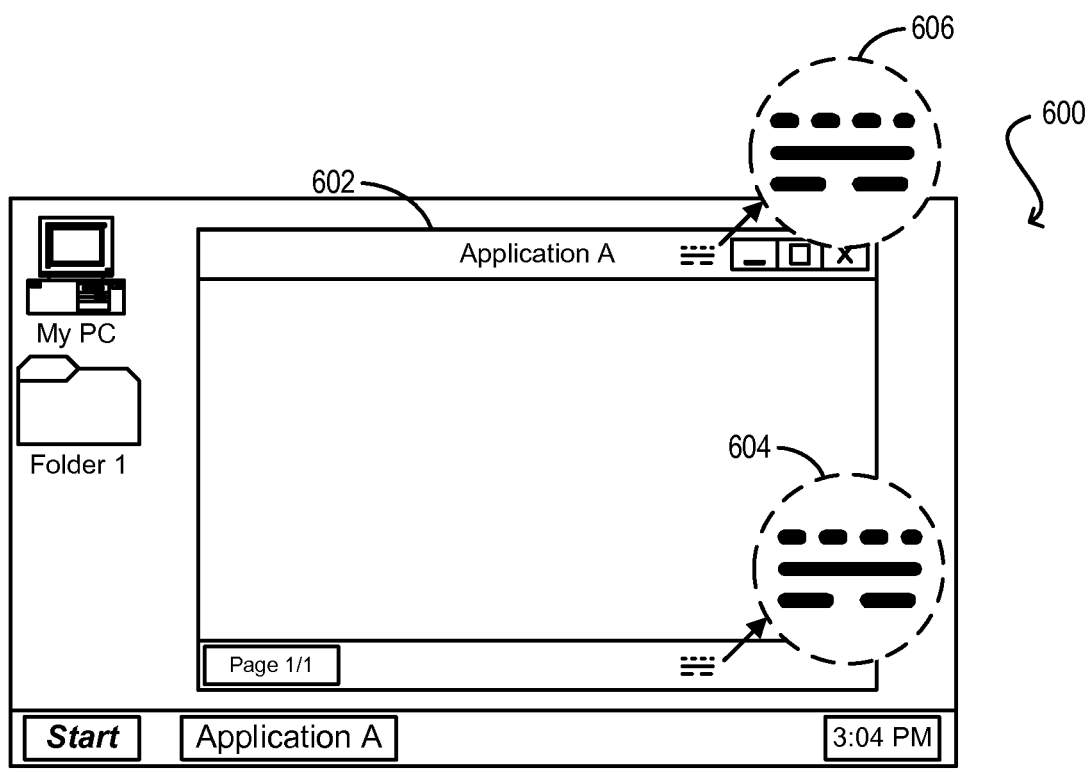
FIG. 6 depicts an image of a desktop that includes application markers according to one embodiment.

FIG. 6 depicts an exemplary representation of desktop 206 (600) that includes a window 602 for application "A" and two application markers (604 and 606) that server agent 212 has added to window 602. In the embodiment of FIG. 6, application markers 604 and 606 are shown as two-dimensional, black-and-white barcodes. However, in other embodiments, application markers 604 and 606 can correspond to any arrangement of pixels that is capable of encoding information. Each application marker can encode the user input captured by server agent 212. Each application marker can also encode other information such as the type of the desktop operation, the application associated with the desktop operation, etc.

Notably, in FIG. 6, application markers 604 and 606 are located substantially near the top and bottom of window 602 respectively. This configuration can be useful because desktop 206 is typically rendered in a raster scan fashion (left to right, top to bottom). By incorporating markers at both the top and bottom of window 602, server agent 212 can ensure that client agent 210 does not infer that the desktop operation corresponding to window 602 is complete until window 602 is fully rendered (and thus fully visible to the user of client device 104-X). In alternative embodiments, server agent 212 can place application markers 604 and 606 at other locations within window 602, or use fewer or more application markers.

Turning now to FIG. 4B, process 400 can continue at block 420, where remote desktop server application 208 can capture an image of desktop 206 that includes the one or more application markers added at block 418 and send the desktop image to remote desktop client application 204. Remote desktop server application 208 can perform this step as part of its normal operation of sending desktop image updates to remote desktop client application 204.

At block 422, remote desktop client application 204 can receive the desktop image that includes the one or more application markers. Client agent 210, which has been monitoring the desktop image updates received from remote desktop server application 208 per block 408, can identify the one or more application markers in the desktop image and correlate the application markers to the first log entry generated at block 402 (block 424). For instance, client agent 210 can match the user input identified in the application markers to the user input identified in the first log entry. Client agent 210 can then generate a second log entry that includes the user input and a timestamp indicating the time at which the one or more application markers were received (block 426). In this manner, client agent 210 can record the effective "end time" of the desktop operation as perceived by the user. In cases where the one or more application markers encode additional information such as the type of the desktop operation, the application associated with the desktop operation, etc., client agent 210 can include this additional information in the second log entry.

Although not shown in FIGS. 4A and 4B, after the generation of the second log entry, client agent 210 can calculate the difference between the timestamps of the first and second log entries, thereby determining the overall latency perceived by the user of client device 104-X for executing the desktop operation from start to finish. Client agent 210 can subsequently transmit this latency data (or the raw log entry data) to one or more other systems for monitoring, analysis, or reporting. For example, the data can be used for sizing experiments, or for real-time determination of end-user performance issues in live deployments. In a particular embodiment, a central server can use the received latency/log entry data as part of a feedback loop for dynamically modifying the configuration of server system 102. For instance, if the central server determines that remote desktop performance is too low (as indicated by high latency), the central server can, e.g., change the desktop-to-server consolidation ratio or other operating parameters on server system 102, thereby allowing each VM access to a larger allocation of server resources and thus improving performance. In this way, the central server can address remote desktop performance issues in real-time based on the data collected by client agent 210.

Figure 7A:
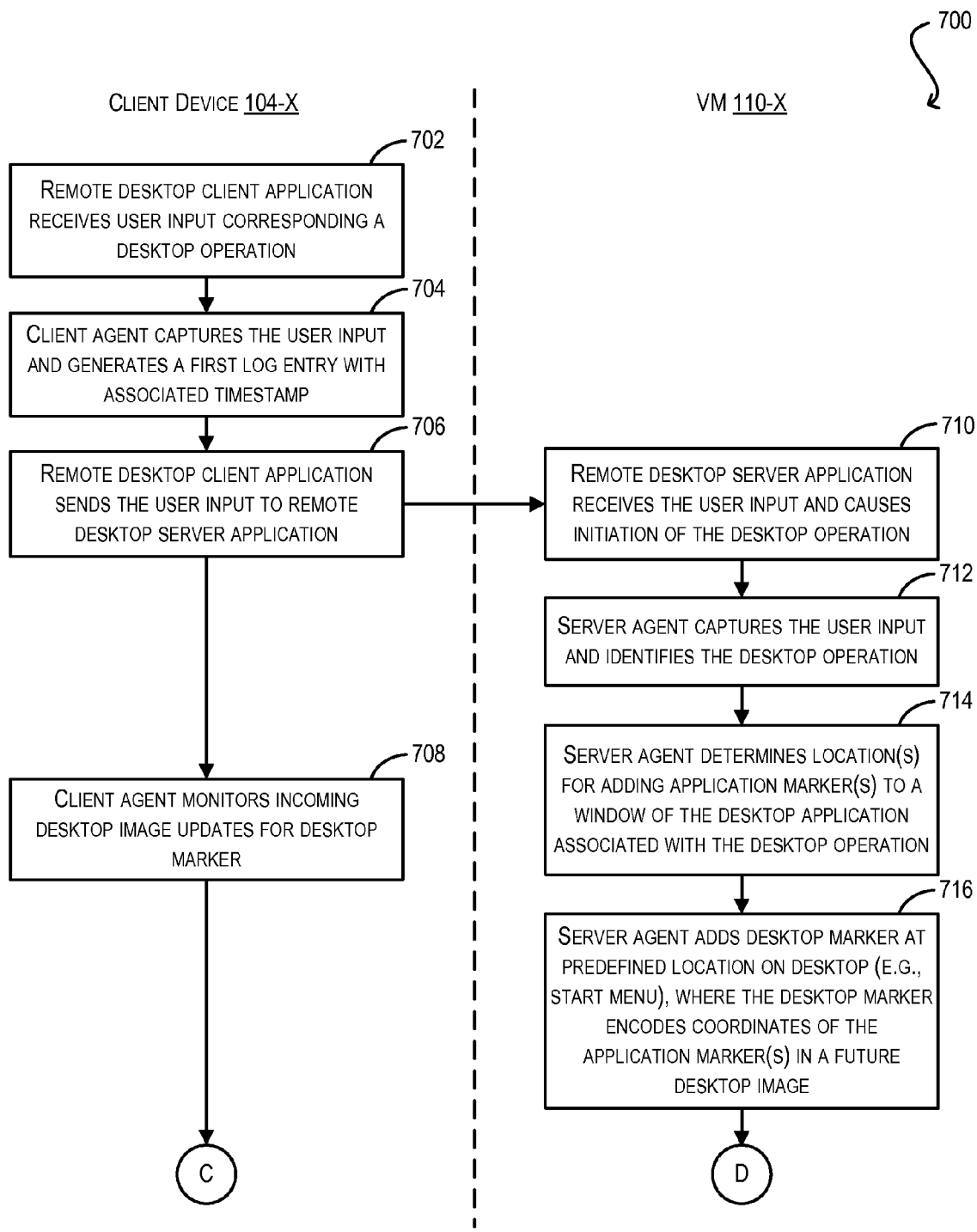
FIGS. 7A and 7B depict an alternative flowchart for measuring client-side latency when performing a remote desktop operation according to one embodiment.
Figure 7B:
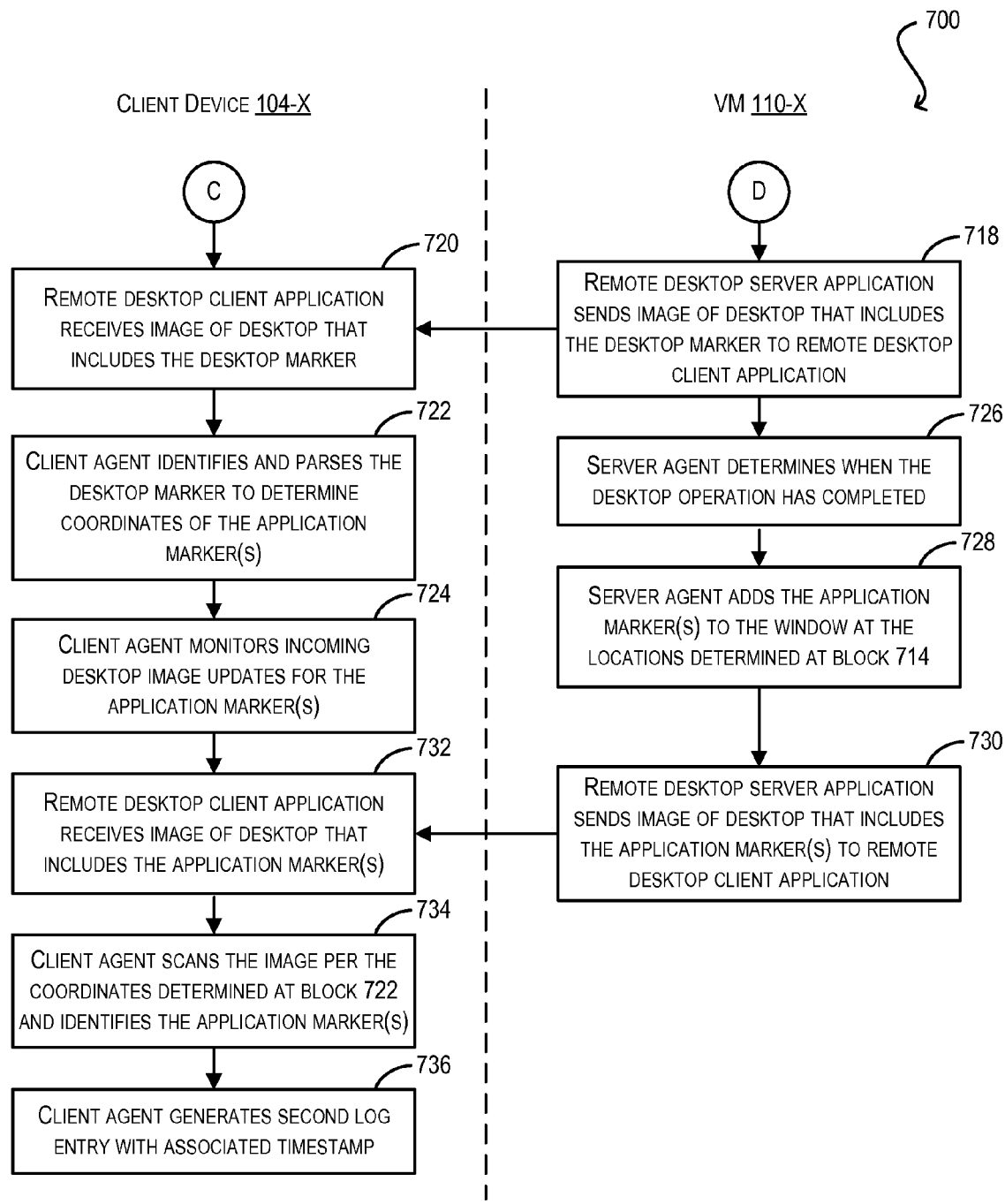

One potential inefficiency with process 400 of FIGS. 4A and 4B may occur at block 408, where client agent 210 monitors incoming desktop images updates for the one or more application markers that signal the end of the desktop operation. Since client agent 210 does not have prior knowledge of where exactly the application markers will appear, client agent 210 needs to scan the entirety of each desktop image update to try and identify the application markers. FIGS. 7A and 7B depict an alternative version of process 400 (700) that addresses this issue by implementing a two-stage marker notification technique.

Figure 8:
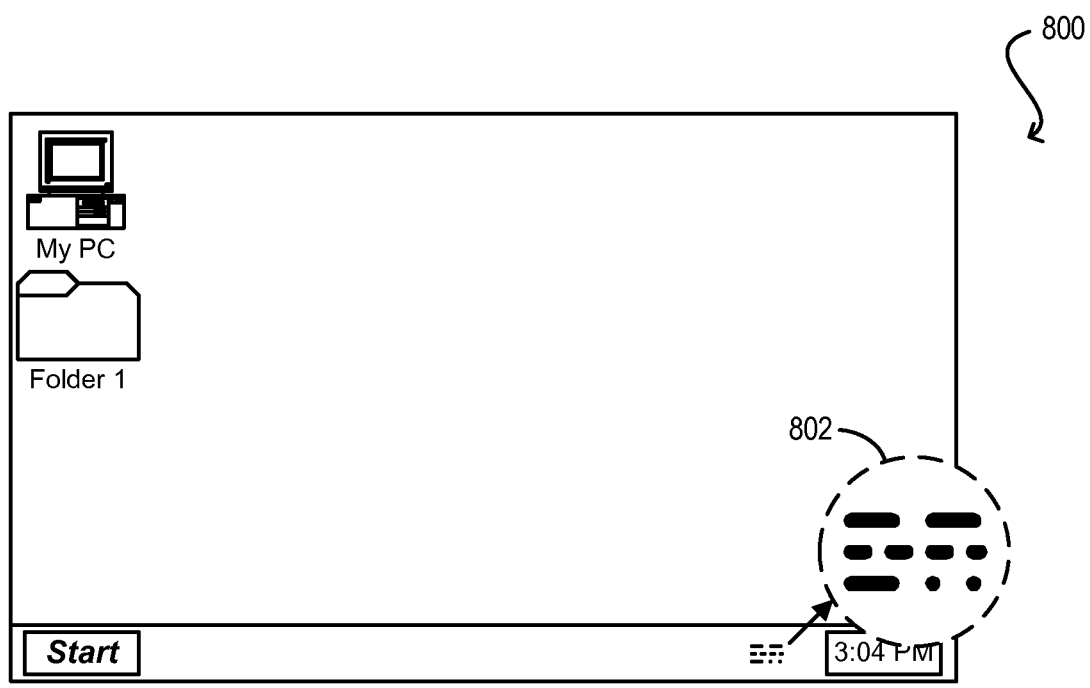
FIG. 8 depicts an image of a desktop that includes a desktop marker according to one embodiment.

Blocks 702-714 of process 700 are substantially similar to blocks 402-414 of process 400. At block 716, server agent 212 can add, prior to the completion of the desktop operation, an initial "desktop" marker at a predefined location on desktop 206. This predefined location can be known to both server agent 212 and client agent 210. The desktop marker can encode the locations (e.g., coordinates) of the application markers as they will appear in a future desktop image update (once the desktop operation has completed). The desktop marker can also encode other information such as the type of the desktop operation, the application associated with the desktop operation, etc. In a particular embodiment, the desktop marker can be located at a position on desktop 206 that will not be obscured by application windows, such as an OS-level taskbar. For instance, FIG. 8 depicts a representation of desktop 206 (800) that shows a desktop marker 802 added to the "Start" menu/taskbar in Windows.

Once the desktop marker has been added to the desktop, remote desktop server application 208 can capture this change and send an image of the desktop that includes the desktop marker to remote desktop client application 204 (block 718 of FIG. 7B). At block 720, remote desktop client application 204 can receive the desktop image that includes the desktop marker. Client agent 210, which has been monitoring the desktop image updates received from remote desktop server application 208 at the known location for desktop marker, can identify and parse the desktop marker to determine the coordinates of future application markers (block 722). Client agent 210 can then begin monitoring the incoming desktop image updates at those specific coordinates in order to identify the application markers (block 724). Thus, client agent 210 does not need to scan the entirety of each desktop image update to try and find the application markers as in process 400.

At blocks 726 and 728, server agent can determine when the desktop application has been completed and can add the application markers to the appropriate application window at the coordinates encoded in the desktop marker. The remaining steps of process 700 (730-736) can then proceed in a manner similar to process 400 (e.g., client agent 210 receives a desktop image that includes the application makers, identifies the application markers, and writes a second log entry/timestamp signaling the end of the desktop operation).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a server system from a client device configured to remotely access a desktop hosted by the server system, user input directed to the desktop;
   identifying, by the server system, a desktop operation to be performed in response to the user input;
   adding, by the server system, an initial marker to the desktop, the initial marker encoding coordinates of one or more markers that will be added to the desktop in the future upon completion of the desktop operation;
   transmitting, by the server system to the client device, a first image of the desktop that includes the initial marker;
   determining, by the server system, when the desktop operation has completed;
   upon completion of the desktop operation, adding, by the server system, the one or more markers to the desktop at the coordinates encoded in the initial marker; and
   transmitting, by the server system to the client device, a second image of the desktop that includes the one or more markers, thereby signaling the completion of the desktop operation to the client device.

2. The method of claim 1 wherein identifying the desktop operation to be performed in response to the user input comprises determining, based on the user input, whether the desktop operation is a launch of a desktop application or an interactive action within a desktop application.

3. The method of claim 2 wherein, if the desktop operation is a launch of a desktop application, identifying the desktop operation further comprises determining the identity of the desktop application to be launched.

4. The method of claim 3 wherein determining the identity of the desktop application to be launched comprises monitoring for one or more registry or file changes initiated by an operating system of the desktop.

5. The method of claim 3 wherein determining the identity of the desktop application to be launched comprises monitoring an active process list exposed by an operating system of the desktop.

6. The method of claim 2 wherein, if the desktop operation is a launch of a desktop application, determining when the desktop operation has completed comprises determining when a window corresponding to the desktop application to be launched has been rendered by an operating system of the desktop.

7. The method of claim 2 wherein, if the desktop operation is an interactive action within a desktop application, identifying the desktop operation further comprises determining a type of the interactive action.

8. The method of claim 2 wherein, if the desktop operation is an interactive action within a desktop application, determining when the desktop operation has completed comprises determining when a result of the interactive action has been rendered within the desktop application by an operating system of the desktop.

9. The method of claim 1 wherein the initial marker is positioned at a predefined location in the first image of the desktop that is known to the client device.

10. The method of claim 1 wherein the one or more markers encode the user input received from the client device.

11. The method of claim 1 wherein the one or more markers each comprise a set of encoded pixels.

12. The method of claim 1 wherein adding the one or more markers to the desktop comprises:
    determining an application window associated with the desktop operation;
    adding a first marker in the one or more markers to a first location within the application window; and
    adding a second marker in the one or more markers to a second location within the application window.

13. The method of claim 1 wherein the identifying, determining, and adding are performed by a software process that is distinct from an operating system of the desktop and distinct from remote desktop software configured to make the desktop remotely accessible to the client device.

14. A non-transitory computer-readable storage medium embodying computer software, the computer software being executable by a server system and causing the server system to execute a method comprising:
    receiving, from a client device configured to remotely access a desktop hosted by the server system, user input directed to the desktop;
    identifying a desktop operation to be performed in response to the user input;
    adding an initial marker to the desktop, the initial marker encoding coordinates of one or more markers that will be added to the desktop in the future upon completion of the desktop operation;
    transmitting, to the client device, a first image of the desktop that includes the initial marker;
    determining when the desktop operation has completed;
    upon completion of the desktop operation, adding the one or more markers to the desktop at the coordinates encoded in the initial marker; and
    transmitting, to the client device, a second image of the desktop that includes the one or more markers, thereby signaling the completion of the desktop operation to the client device.

15. A method comprising:
    receiving, by a client device, user input corresponding to a desktop operation to be performed with respect to the desktop hosted on a server system;
    writing, by the client device, a first log entry identifying the user input and a time at which the user input was received;
    transmitting, by the client device, the user input to the server system;
    receiving, by the client device from the server system, a first image of the desktop that includes an initial marker, the initial marker encoding coordinates of one or more markers that will be added to the desktop in the future upon completion of the desktop operation;
    receiving, by the client device from the server system, a second image of the desktop that includes the one or more markers, wherein the one or more markers indicate completion of the desktop operation;

scanning, by the client device, the second image at the coordinates encoded in the initial marker to find the one or more markers; and upon finding the one or more markers in the second image, writing, by the client device, a second log entry identifying the user input and a time at which the second image of the desktop was received.

16. The method of claim 15 wherein the initial marker is positioned at a predefined location in the first image of the desktop that is known to the client device.

17. The system of claim 15 further comprising calculating a latency for the desktop operation based on the first log entry and the second log entry.

18. A non-transitory computer readable medium embodying computer software, the computer software being executable by a client device and causing the client device to execute a method comprising:

receiving user input corresponding to a desktop operation to be performed with respect to a desktop hosted on a server system;

writing a first log entry identifying the user input and a time at which the user input was received;

transmitting the user input to the server system;

receiving, from the server system, a first image of the desktop that includes an initial marker, the initial marker encoding coordinates of one or more markers that will be added to the desktop in the future upon completion of the desktop operation;

receiving, from the server system, a second image of the desktop that includes the one or more markers, wherein the one or more markers indicate completion of the desktop operation;

scanning, by the client device, the second image at the coordinates encoded in the initial marker to find the one or more markers; and upon finding the one or more markers in the second image, writing, by the client device, a second log entry identifying the user input and a time at which the image of the desktop was received.

* * * * *